A. E. THOMPSON.
BATTERY.
APPLICATION FILED DEC. 18, 1911.
1,040,055.
Patented Oct. 1, 1912.
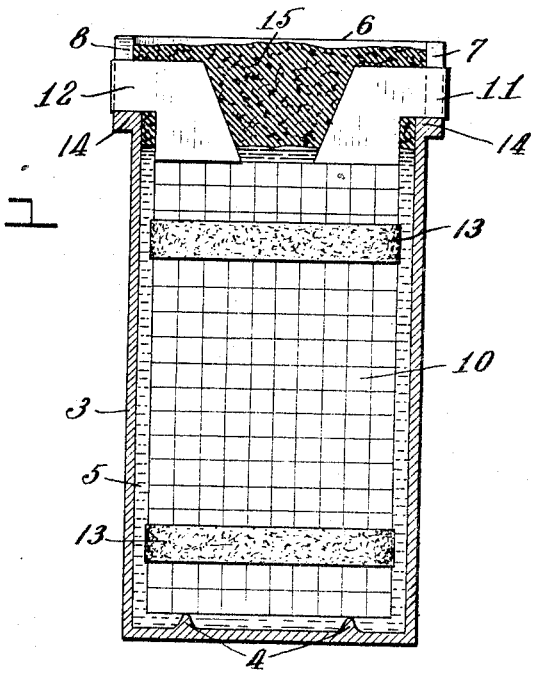
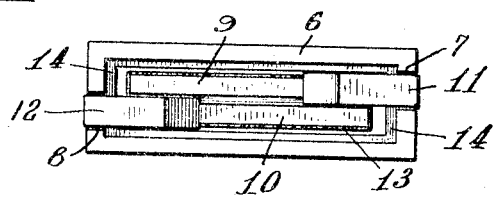
Witnesses
H. C. Robinette
Walton Harrison
Inventor
A. E. Thompson
By Meyers, Cushman & Rea
Attorney

UNITED STATES PATENT OFFICE.

ALVA E. THOMPSON, OF HASTINGS, COLORADO, ASSIGNOR, BY DIRECT AND MESNE ASSIGNMENTS, TO THE MINERS ELECTRIC SAFETY LAMP MANFG. CO., OF TRINIDAD, COLORADO, A CORPORATION OF COLORADO.

BATTERY.

1,040,055.  Specification of Letters Patent.  Patented Oct. 1, 1912.

Application filed December 18, 1911. Serial No. 666,422.

*To all whom it may concern:*

Be it known that I, ALVA E. THOMPSON, a citizen of the United States, residing at Hastings, in the county of Las Animas and State of Colorado, have invented new and useful Improvements in Batteries, of which the following is a specification.

My invention relates to batteries, and more particularly to battery jars, the special object of my improvement being to provide a battery having a jar adapted for holding grids or their equivalent in such manner that the lugs or ears of the grids extend through slots and rest upon reinforced portions partially bounding said slots, and so disposed as to give the jar great strength where it might otherwise be weakened by virtue of said slots and of the engagement of the metallic parts against the bottoms of said slots. In this connection it may be stated that my battery jar is suitable for use as part of a storage battery, though in some instances I desire to employ it for holding the elements of a dry battery.

It has been found in practice that where grids are employed in a storage battery, or members analogous to grids have been used in a dry battery, it is desirable that the ears or lugs of the grids or analogous members should be caused to protrude out through slots in the wall of the battery jar or cell, and that if this be done the lugs or ears may be caused to last much longer owing to the fact that they are not exposed to corrosion, and hence are better protected. This arrangement also enables the ears or lugs to be so located as to be readily available and easily accessible at all times.

The use of battery jars or cells provided with slots for the purpose just indicated, however, is attended with some difficulty, especially in the case of storage batteries in which the leaden grids employed, and the active material used in connection with such grids, are very heavy. Owing to the heavy weight of the grids and to the fact that the lugs of the grids extend through the slots, and, therefore, into engagement with the wall of the battery jar, the likelihood of breakage of the jar is greatly increased. It is true that in many instances provision is made for supporting the grids without resting all, or even a considerable proportion, of their weight upon the battery cell, but even in such cases a sudden movement given to the battery, as for instance in setting it down abruptly, is liable to throw excessive mechanical strain upon the battery cell at points located adjacent to the slots, and the breakage of the jar is likely to result. Again, it should be noted that battery grids are very expensive as compared with the cost of jars, and that frequently several grids are mounted in the same jar. This being the case and the storage battery being in many instances portable, and the breakage of a jar being likely to injure the grids and practically certain to spill the battery fluid, it becomes highly essential to avoid the undue chances for breaking the jar. Of course, the breaking of a jar does not necessarily imply the injury of a grid carried by it, but experience shows that when a jar is broken there is some likelihood at least for one or more expensive grids to be damaged.

With the foregoing considerations in mind I have produced a battery the jar of which, while provided with slots for receiving the lugs of grids or the like, is so reinforced at points immediately adjacent to said slots and bounding said slots that the likelihood of a jar to become broken by virtue of the weight of the grids or by such weight taken in connection with a sudden motion given to or an abrupt stoppage of motion of the battery considered as a portable affair, is very greatly reduced. In effect I give the battery jar such form that the bottom boundaries of the slots coincide with the upper surface of a thickened portion of the battery wall so formed as to act somewhat after the manner of a supporting rail, it being integral with other portions of the wall of the jar.

Reference is made to the accompanying drawing forming a part of this specification, in which like letters indicate like parts.

Figure 1 is a vertical section through my improved battery complete. Fig. 2 is a plan view of the same.

The jar is shown at 3, and is in this instance provided internally at its bottom with ribs 4 integral with the bottom of the jar and extending crosswise thereof. The battery fluid is shown at 5, and may be either a diluted solution or a paste according to circumstances. The battery jar 3 is provided adjacent to its upper edge with a portion 6 integral with it, this portion being of greater distance, measured across either externally or internally, than that of the body portion below it. The portion 6 of the jar is provided with slots 7, 8, extending from its extreme upper surface downwardly for a distance almost but not quite equal to the vertical depth or height of the portion 6. The battery elements are located within the jar and in this instance consist of two grids 9, 10, provided with lugs 11, 12, these lugs extending, respectively, through the slots 7, 8. A pair of endless bands 13, of ordinary soft rubber, are stretched around the grids for the purpose of holding them in position, and they are also spaced apart in the usual or any desired manner. The two grids shown are held together as a couple and rest in part upon the ribs 4.

The battery jar is provided with a thickened portion 14, between the portion 3 or body proper of the jar and the portion 6 thereof. The thickened portion 14 is in this instance integral with the other portions of the jar, and has a thickness equal to the combined thickness of the portions 3 and 6, as will be understood from Fig. 1. This thickened portion 14 acts in a measure as a supporting rail and the lugs 12 at their bottoms engage its upper surface directly, so that a part of the weight of the grids rests upon the thickened portion 14. The slots 7, 8, being in the nature of mutilations, have necessarily a tendency to weaken the jar, especially at points located adjacent to the bottoms of these slots. The increased thickness of the portion 14, however, offsets this tendency toward weakness due to the presence of the slots, and reinforces the jar in a general way at the particular points where it would otherwise be most weakened. Indeed the bottom boundary of each slot 7, 8, is simply the top surface of the thickened portion, and as this thickened portion extends continuously across the battery jar it reinforces the latter, not only at the bottoms of the slots but also at points located upon each side of each individual slot. The thickened portion thus acts to some extent as a supporting rail for reinforcing the jar clear across and at the same time serves more specifically for the purpose of enabling the lugs or ears of the grids to make contact directly with large abutting surfaces constituting, fragmentarily, the lower boundaries of the several respective slots.

After the grids are mounted as above described, a filling 15 of pitch or thickened tar may be added. This filling may be merely poured into the top of the jar and is sufficiently plastic to flow around the lugs and into all available space adjacent thereto within the jar so as to make a neat fit. By virtue of the fact that the internal distance across the portion 6 of the jar is greater than that across the lower portion of the jar, the portions 14 present, internally of the jar, supporting ledges or shoulders, and as the filling by virtue of its plasticity or fluidity acquires a shape for mating these surfaces, the filling is very effectively supported by the battery jar and independently of the fit of the filling relatively to the lugs carried by the grids. In other words, the filling during its formation acquires such a shape that it would rest automatically in position within the top of the jar even if no grids were present. The grids being in position, however, and the filling being formed around the lugs carried by them, so that these lugs are for parts of their length embedded securely within the filling, the grids are effectively braced and strengthened by the filling, and are thus prevented from moving relatively to the jar in case the position of the jar is abruptly shifted. In thus preventing relative movement as between the grids and the jar, the filling serves the purpose of strengthening the jar as well as performing the usual office of a filling.

I do not limit myself to the precise construction shown as within reasonable limits it may be varied for different purposes, the scope of my invention being commensurate with my claims.

I claim:—

1. A battery jar comprising a containing vessel provided with a wall and with a massive portion thicker than said wall, said massive portion being integral with said wall and forming a continuation thereof, said containing vessel being further provided with a portion displaced relatively to the general plane of said wall, said last mentioned portion having slots extending from its outer edge to the adjacent surface of said massive portion.

2. A battery jar comprising a containing member provided with a wall and with a massive portion forming a continuation of said wall and integral therewith, said containing member being further provided with a portion extending from said massive portion and out of alinement relatively to said wall, said portion being provided with slots extending flush with the adjacent surface of said supporting portion.

3. The combination with a battery jar having a wall provided with a thickened portion and further provided with a portion extending from said thickened portion and having slots extending flush with said thickened portion, of battery elements located within said containing member and provided with lugs extending through said slots, and a filling resting in part upon said supporting portion, said filling partially enveloping said lugs.

In testimony whereof I have hereunto set my hand in presence of two subscribing witnesses.

ALVA E. THOMPSON.

Witnesses:
J. W. CUSTBY,
SAM TROSSARELLO.